Oct. 18, 1938.  F. Y. NICHOLS  2,133,304
PACKING FOR ROTARY SHAFTS
Filed Oct. 18, 1935
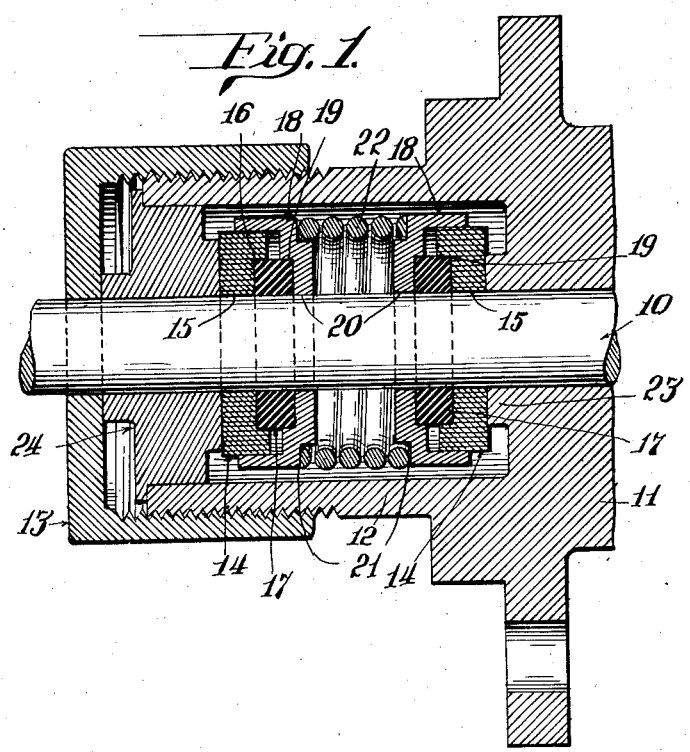
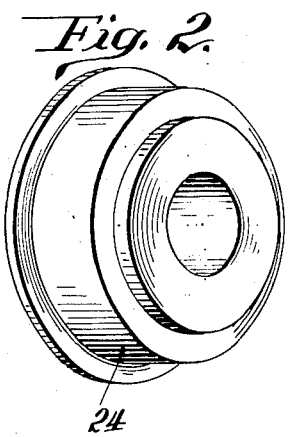
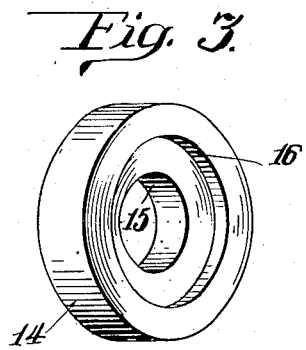
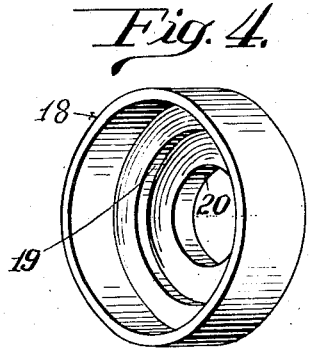
Inventor
Frederick Y. Nichols
Witnesses
Attorney Patented Oct. 18, 1938

2,133,304

UNITED STATES PATENT OFFICE 2,133,304

PACKING FOR ROTARY SHAFTS

Frederick Y. Nichols, Chicago, Ill.

Application October 18, 1935, Serial No. 45,602

3 Claims. (Cl. 286—7)

My invention relates to an improved packing for effecting fluid tight relation about the rotating shaft or element of a pump or in any structure and to also provide a seal for the packing glands and metal wall of the packing chamber, the invention being especially adapted for use in connection with rotating shafts as for example the rotating shaft of a rotary pump where a fluid-tight condition about the rotating shaft is essential and generally difficult to obtain.

The invention also has for its object the provision of a durable structure which will provide a double seal as it were about the rotating member or shaft to prevent escape from the packing chamber and at the same time a structure of comparatively inexpensive and simple nature.

The objects of my invention and the advantages inherent therein will all be understood and more readily apparent from the detail description of the accompanying drawing, wherein:

Figure 1 is a longitudinal sectional view of the packing chamber of a rotary pump with a portion of the rotating shaft shown and my invention applied thereto.

Figure 2 is a detail perspective view of a chamber closure and gland member.

Figure 3 is a perspective view of one of the packing elements.

Figure 4 is a perspective view of a packing member.

My invention, as previously stated, is applicable for use where packing glands are employed; being, however, especially adapted for use in connection with rotating shafts, as for example to provide a rotary seal for the rotating shaft of a rotary pump, which, for purposes of exemplification, I have chosen to illustrate. The illustration shows a portion of a rotary shaft at 10 extending through the casing wall 11 (for example the casing of a rotary pump); the casing being provided with a tubular extension 12 which provides a packing chamber and is shown externally threaded to receive the cap nut 13 which screws thereon.

In order to effect a fluid tight relation about the shaft 10, and a seal at the metal wall of the chamber and at the gland, I provide the portion of the shaft 10 located in the packing chamber preferably with a pair of packing members 14, 14, shown in the nature of discs centrally apertured for passage of the shaft 10 therethrough.

The packing discs or members 14 are preferably of the type made of a sheet of suitable fabric, such as muslin and the like, saturated with rubber or a rubber compound tightly wound into cylindrical form and then cut into rings or discs of desired width and vulcanized; the edges of the fabric thus constituting the flat sides of the packing members 14. The sides of the discs when properly made and vulcanized present comparatively hard wear resisting and non-scoring surfaces of great durability which will provide a proper rotating seal with the metal surfaces or elements of the packing chamber.

These discs or members 14 are each formed with an opening as at 15 of size just sufficient to permit passage of the shaft 10 therethrough and one side of each member 14 is formed with an annular recess 16 of predetermined diameter and depth; the recess 16 being formed concentric with the shaft opening 15 and therefore with the axis of the member.

The recess 16 is intended to provide a seat for an annular rubber washer or ring 17 centrally apertured to afford snug fitting relation with the shaft 10. The rubber washer 17 is of substantially the same size as the diametrical dimensions of the recess 16 in member 14 and therefore fits snugly into the recess as shown in Figure 1.

The washer or ring 17 is preferably of a thickness materially greater than the depth of the recess 16 in the fabric packing member 14.

The rotary shaft 10 is also provided with a cup-shaped metal washer element 18, shown in detail in Figure 4, with the bottom of the element provided with an annular recess 19, concentric with the shaft opening 20 and of a diameter just large enough to receive the protruding end of the rubber washer or ring 17, as shown in Figure 1. The outer face of the base or bottom of the metal washer 18 is preferably provided at its perimeter with an annular recess, shown at 21 in Figure 1 to provide a seat for the coil spring 22.

The skirt or side wall of the metal washer 18 is adapted to encircle the fabric washer element 14 and have free telescopic relation therewith.

The rubber washer 17 is of a thickness materially greater than the combined depths of the recess 16 in member 14 and recess 19 in metal washer 18 so that a portion of the rubber washer 17 will be disposed intermediate of the packing member 14 and the base of the metal washer 18 as shown in Figure 1, thus maintaining the body portions of member 14 and washer 18 in spaced relation. In practice, I prefer to make the rubber washer or packing element 17 of such width that approximately one-third of the element 17 will be seated in the recess 16 of element 14, one-third will be seated in the recess 19 of washer 18, while one-third of the rubber element 17 will be intermediate of elements 14 and 18 so as to permit of ample relative movement between elements 14 and 18 and hence constant compressive action on the rubber packing member 14.

In the exemplification, my improved rotary packing is shown applied to a shaft as employed in rotary pumps, with the casing extension 12 forming a stuffing or packing box, as well as a bearing for the shaft; and where the pump is employed for pumping oil or certain gaseous mediums, it is desirable to provide a double seal, as it were, for the rotating shaft 10. Therefore, opposite ends of the box or chamber are provided with similar packing elements 14, 17 and 18 arranged as heretofore described and these groups of elements are maintained in spaced relation and under pressure by the coil spring 22, with the seal providing fabric members 14 contacting the non-rotating metal portions in the stuffing or packing chamber. In the construction shown, the pump casing wall 11 concentric with the shaft opening is shown preferably provided with the annular boss 23 against which the flat non-recessed side of the fabric packing member 14 rests as shown so as to provide a non-leak relation or seal with the boss 23 of the casing. This member 14, as previously described, on its opposite face is recessed and receives rubber packing member or washer 17, whose opposite end is seated in the recess of the metal cup-shape element 18. The outer side of the bottom of element 18, at its perimeter, is annularly recessed and receives one end of the coil spring 22; while the opposite end of the spring 22 bears against the other metal element 18 whose opposite side receives and bears against the other rubber member 17, seated in the recess of the other fabric packing member 14 whose outer flat face contacts and has seal providing relation with the metal pressure applying gland member 24 which is forced into firm pressing relation with member 14 by the gland or cap nut 13.

The cap nut 13 is intended to be screwed onto the threaded exterior surface of the packing box or extension 12 so as to force gland member 24 into firm relation with member 14; element 18 being forced toward member 14 through the action of coil spring 22 which is constantly maintained under compression. As a result, spring 22 will exert great pressure on the metal element 18 at the opposite or inner end of the chamber and hence exert pressure on rubber washer 17 and force fabric member 14 in firm sealing relation with the boss or wall of the casing.

With the rubber rings 17, 17 of greater thickness than the combined depths of the recesses in the correlated members 14 and 18, the rubber rings will be under considerable compression and by reason of the ends of these rubber rings being encompassed by the non-yielding walls of members 14 and 18, the rubber washers 17 are forced toward or into contracted relation with the rotating shaft 10. The rubber washers 17, 17 will effect such fluid or gas tight relation with the shaft that the entire packing will rotate with the shaft and hence the gripping condition of the rubber washers on the shaft will maintain. At the same time the fabric packing member 14 will provide a tight seal with the non-rotating portions 23 and 24. Constructing the packing members 14 of fabric rolled tightly upon itself so that the edges of the fabric, instead of the flat face of the fabric, are presented to the non-rotating portions produces a very much more effective seal; a seal which is not affected by minute foreign particles which, however, would tend to score a smooth surfaced metal packing member as heretofore employed.

With the construction and arrangement shown, compensation for any slight misalignment of the shaft is provided by reason of the rubber packing elements and their relation to the other elements of the packing; the rubber elements or washers being partially free or in the open afford a slight universal motion as it were.

When the gland member 24 is forced inwardly against packing member 14, the latter, through rubber ring 17 forces cap member 18 inwardly which compresses spring 22 against the cap member 18 at the other end which in turn compresses the rubber ring 17 at the inner end of the chamber and forces packing 14 into firm relation with the boss 23 of the casing or casing cover member 11. The packing or fabric members 14, 14 provide seals on the non-rotating metal faces while the rubber washers 17, 17 are compressed into pinching relation with the shaft and produce a tight seal on the shaft.

Although the packing is especially intended for the rotating shaft of a rotary pump, it is apparent that the packing may be used in other structures and instead of the double arrangement shown in the drawing may be of a single type consisting, in a general way, of the sealing ring or element of fabric, the rubber ring or element held against expansion movement, and means whereby the latter is placed under pressure, all as generally hereinbefore described; and while I believe the construction as described is the best embodiment of the invention, certain modifications are possible and may be made without, however, departing from the spirit of my invention.

What I claim is:—

1. In packing of the character described, a packing disc composed of impregnated fabric wound upon itself so as to extend from side to side of the disc with the edges of the fabric constituting the two side faces of the disc, the disc being vulcanized into a hard mass and centrally apertured to receive a shaft and one side face of the disc being provided with a washer receiving recess concentric with the shaft receiving aperture; and a rubber ring snugly seated in said recess and extending beyond the recessed face of the disc.

2. A packing of the character described comprising a packing disc of vulcanized fabric wound upon itself so the edges of the fabric constitute the side faces of the disc, the wound fabric being pressed into a solid disc and centrally apertured for passage of a shaft therethrough, one face of the disc being flat to constitute a wear resisting face for sealing contact with a non-rotating element while the other face is provided with an annular recess concentric with the shaft receiving aperture, a rubber washer adapted to be seated in said recess in snug contact with the shaft and to protrude beyond the side of the disc, a metallic member apertured for passage of a shaft therethrough and recessed on one side to receive the other end of said washer; the thickness of the rubber washer normally being greater than the combined depths of the recesses in the packing disc and in the metallic member; and means whereby the metallic member is forced toward the packing disc and the rubber washer deformed into snug relation with the shaft and the fabric disc, metallic member and the rubber washer caused to rotate with the shaft.

3. A packing of the character described comprising, in combination with a rotating element and a packing chamber disposed about said element, a pair of members arranged at each end of the chamber about the shaft one member of each pair being composed of vulcanized fabric and one face adapted to effect face sealing relation with a non-rotating wall in the chamber while the other member of each pair is of non-yielding material with the outer side shouldered to provide a spring-seat, the opposing faces of the two members of each pair having annular recesses concentric with the shaft receiving openings therethrough, a resilient washer seated in the recesses of each pair of members, and of width greater than the combined depth of the correlated recesses and to be compressed into snug relation with the rotating element and the members and washer made to rotate with the element, a spring intermediate of the two pairs of members with the ends seated on the shouldered faces of said members, and regulable means at the end of the chamber whereby the packing members and said spring are placed under pressure.

FREDERICK Y. NICHOLS.